July 17, 1934.  A. L. MAYER  1,966,556
CAMERA SHUTTER
Filed April 18, 1933  2 Sheets-Sheet 1

INVENTOR
ALVIN L. MAYER
BY
Baldwin + Wight
ATTORNEYS

July 17, 1934.  A. L. MAYER  1,966,556
CAMERA SHUTTER
Filed April 18, 1933   2 Sheets-Sheet 2
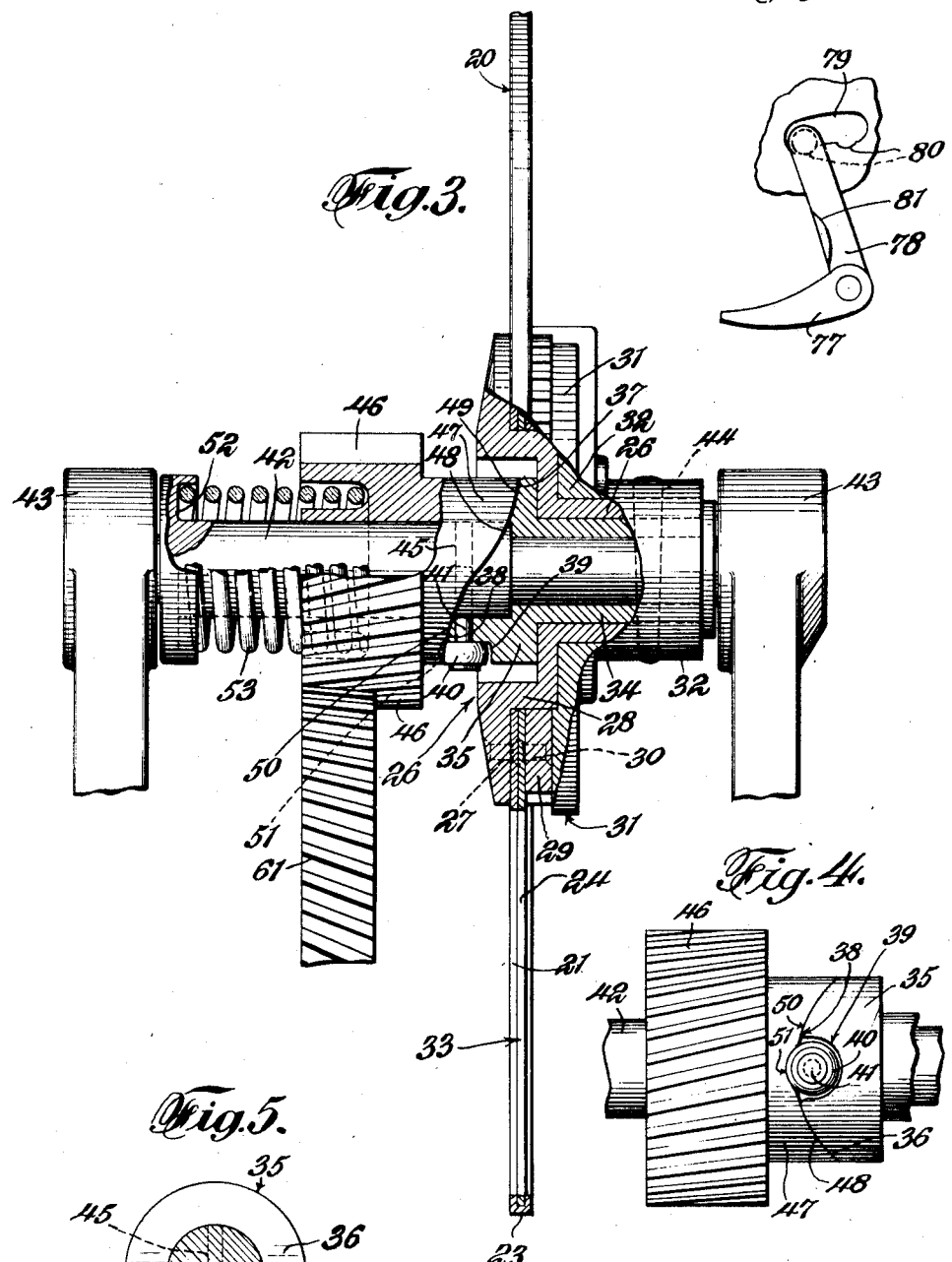
INVENTOR-
ALVIN L. MAYER
BY
Baldwin + Wight
ATTORNEYS Patented July 17, 1934

1,966,556

UNITED STATES PATENT OFFICE 1,966,556

CAMERA SHUTTER

Alvin L. Mayer, New York, N. Y.

Application April 18, 1933, Serial No. 666,728

14 Claims. (Cl. 88—19.3)

The invention, which relates generally to cameras of the type wherein are employed rapidly rotating exposure controlling shutters moved in synchronism with negative film moving means and means for automatically terminating the shutter and film movement upon completion of the desired number of exposures, primarily seeks to provide novel means for so connecting a rotary shutter with its driving connections as to permit it to overrun when the sudden automatic stoppage of shutter and film movement occurs and thus avoid breakage due to strain resulting from the fly wheel effect of said shutter, said connecting means including devices for assuring resumption of the synchronized relation of said shutter and film equipment.

With the above and other objects in view which will more fully appear, the nature of the invention will be more clearly understood by following the description, the appended claims, and the several views illustrated in the accompanying drawings.

In the drawings:—

Figure 3 is an enlarged right side elevation and part longitudinal section illustrating the overload clutch equipped shutter and its driving connections.

Figure 4 is a detail plan view illustrating the normal engagement of the overload clutch faces.

Figure 5 is a detail vertical cross section taken through the overload clutch equipped shutter driving shaft, the section being taken in the plane of the engaging faces of the clutch elements and looking toward the roller equipped element.

Figure 6 is a detail rear elevation illustrating the stop lever.

Figure 2:
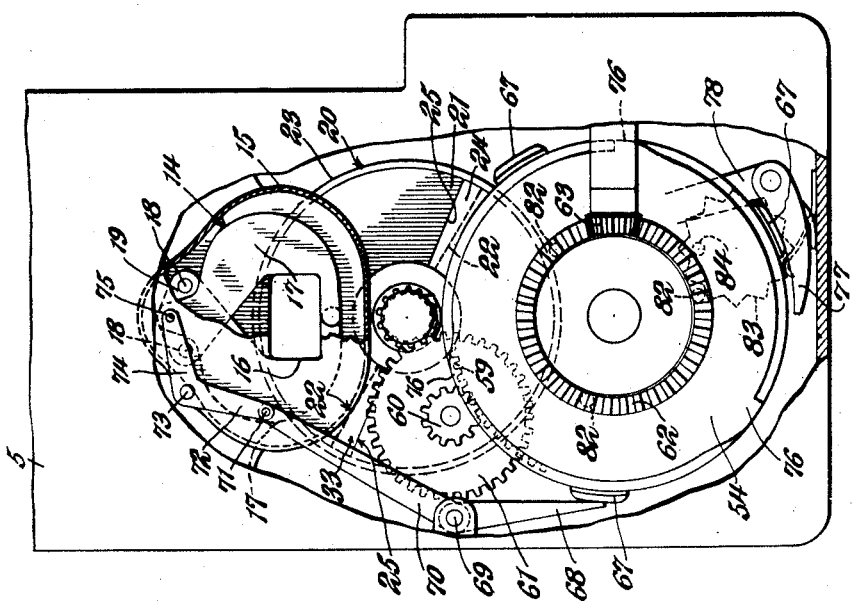
Figure 2 is a rear elevation of the camera, part of the rear wall being broken away to reveal the internal mechanism.

In the drawings in which like numerals of reference indicate like parts in all of the figures, 5 generally designates a camera and 6 the eye thereof through which exposures are made. The negative film 7, which feeds from a spool 8 and downwardly over an idler guide 9 and driver spools 10, is moved step by step or intermittently through the medium of the usual mutilated gear 11 which drives the driven gear 12 mounted on the shaft which carries the driver spools 10. The usual film take-up spool is indicated at 13.

The conventional form of camera shown embraces two shutters which I have hereinafter termed the "primary" and "secondary" shutters for the purpose of convenience. The primary shutter is generally designated 14 and preferably is of the movable wing type adapted to open only during the interval of exposure. The secondary shutter is of the high speed rotary type and will be described in detail hereinafter. The primary shutter comprises a housing or casing 15 having a rectangular permanent opening 16 which is normally closed by wing plates or shutters 17 pivotally mounted as at 18 and having crank portions 19 through the medium of which the wings are actuated at the proper intervals by devices which will be described in detail hereinafter. The primary shutter, opening only at exposure intervals, may be termed an exposure timing shutter.

The secondary shutter is generally designated 20 and comprises a rotary disc or plate 21 provided with a large opening 22 and, at its peripheral edge, with an inturned keeper flange 23 for retaining an adjustable shutter disc or plate 24 likewise equipped with a large opening 25 and which is adapted to be adjusted about its axis of rotation relative to the disc 21 so as to enable varying of the width of the opening collectively formed by the two plates as illustrated in Figure 2 of the drawings. The speed of rotation of the secondary shutter 20 and the width of its opening determines the interval of exposure, and the shutter 20 may therefore be termed an exposure controlling shutter.

The shutter plate 21 is secured to a hub sleeve 26 by rivets or other securing means indicated at 27 and the sleeve 26 includes an enlarged cylindrical portion 28 which forms an adjustable seat for a mounting ring 29 secured as at 30 to the shutter disc or plate 24. The mounting ring 29 and plate 24 are held in frictional contact with the plate 21 by a head flange 31 carried by a sleeve 32 which snugly surrounds the hub sleeve 26 and engages a face of the mounting ring 29. This manner of mounting the plate 24 and its mounting ring 29 enables adjustment of the relation of the plates 24 and 21 so that their respective openings may collaborate in forming a controllable exposure opening indicated at 33 in Figure 2 of the drawings.

Mounted within the hub sleeve 26 is a sleeve 34 which carries an enlarged overload clutch element or head 35, the end face of which terminates in an overload clutch face 36 shaped to present a low point indicated at 37 and a high point indicated at 38, said low and high points being diametrically oppositely disposed and joined by gradually curving surfaces as indicated in Figures 3 and 4 of the drawings. The head 35 is cut out or recessed at its high point as at 39 to accommodate a roller 40 mounted on a radial pin 41 and having its periphery projected slightly beyond said high point as indicated in Figure 4.

The means for imparting rotation to the rotary shutter 20 include a drive shaft 42 having reduced ends rotatably mounted in bearings 43. The sleeves 26, 32 and 34 hereinbefore described surround one reduced end of the shaft 42 and are secured thereon by a pin 44 as indicated in Figure 3 of the drawings. Thus the shutter 20, the sleeves 26, 32 and 34, the head 35 and the shaft 42 rotate as a unit. If desired the pin 41 on which the roller 40 is mounted may be projected into a bore 45 provided therefor in the shaft 42 so as to assist in the securing of the sleeve 34 upon the shaft 42.

A sleeve pinion 46 surrounds the shaft 42 and, being loosely mounted thereon, is capable of sliding longitudinally thereon. The sleeve 46 terminates at one end in an overload clutch element portion 47 having a face 48 complementary to the face of the clutch head 35 hereinbefore described in detail. This clutch face includes a high point 49 and a low point 50 joined by gradually curved surfaces, and the low point is equipped with a slight depression or seat 51 adapted to receive the roller 40 when the clutch faces are in normal driving relation, as illustrated in Figures 3 and 4 of the drawings.

An abutment collar or flange 52 is formed on the shaft 42 and a coil spring 53 surrounds the shaft and seats at its respective ends against the collar 52 and the exposed face of the pinion sleeve 46 for the purpose of yieldably holding the overload clutch faces in driving relation, as illustrated in Figures 3 and 4 of the drawings.

I will now describe the means by which the primary and secondary shutters and the negative film feeding means are operated in synchronism.

Figure 1:
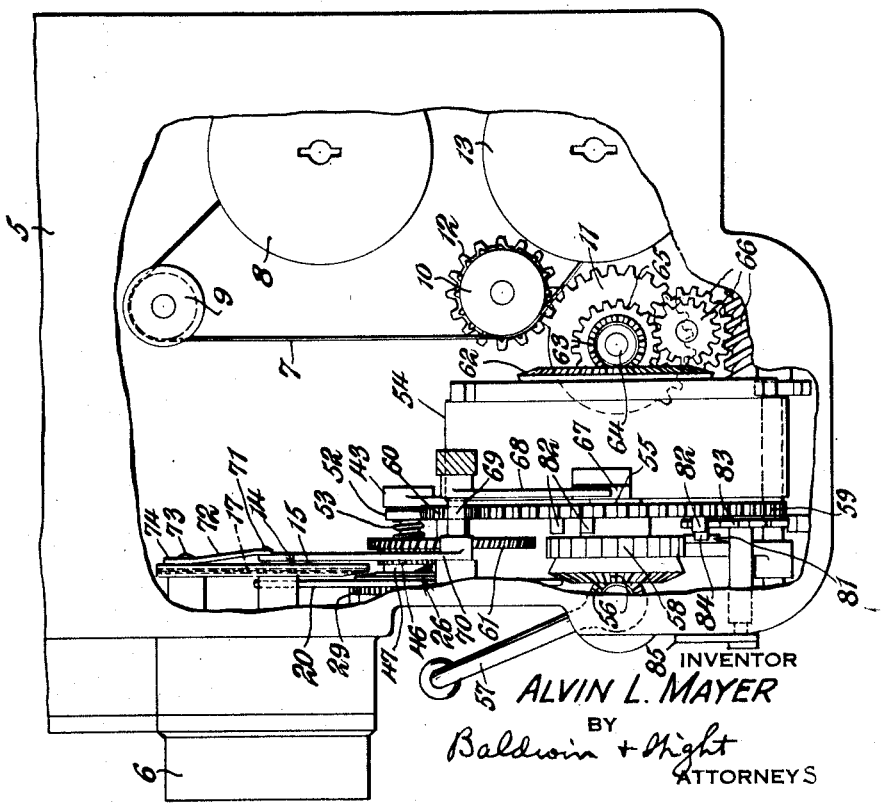
Figure 1 is a left side elevation of a camera embodying the invention, part of the side wall being broken away to reveal the internal mechanism.

A spring drum 54 is rotatably supported in any approved manner within the camera housing and the conventional spring equipment thereof (not shown) may be wound by rotating the spring arbor 55 through the medium of the gearing 56 and the usual crank 57 which projects outside the housing as illustrated in Figure 1. The stored energy of the drum spring is retained by engagement of the usual pawl (not shown) with the ratchet wheel 58.

The spring drum 54 carries a large gear 59 which meshes with a small gear 60 mounted on the same shaft with a large gear 61 which meshes with the sleeve pinion 46 as illustrated in Figures 1, 2 and 3 of the drawings. Thus when the spring drum 54 is rotated through the medium of its enclosed spring rotation will be imparted through gearing 59, 60, 61, and clutch heads 47 and 35 to the rotary shutter 20. The ratio of this gearing is such that the shutter 20 rotates twenty-four times to each rotation of the spring drum 54.

The drum 54 also carries a gear 62 which meshes with a gear 63 mounted on the shaft 64 which carries the mutilated gear 11 and thus rotation of the spring drum serves to impart rotation to the mutilated gear 11 and imparts step feeding movement to the negative film 7. The shaft 64 also carries a gear 65 which serves with the gearing 66 to drive the usual speed governor (not shown). The drum 54 is provided with three equidistantly spaced cam ramps or lugs 67 best shown in Figures 1 and 2 of the drawings and which are adapted to engage with one arm 68 of a bell crank lever pivoted at 69 and having the other arm 70 thereof connected as at 71 with an arm 72 of another bell crank lever which is pivoted as at 73 and has its remaining arm 74 connected as at 75 with the crank portions 19 of the primary shutter wings 17 as indicated in Figure 2 of the drawings. Each time the bell crank levers are influenced by one of the members 67 as illustrated in Figure 2 of the drawings, they serve to move the primary shutter wings 17 from the position in which they normally close the exposure opening 16 to the position in which they open that exposure medium as illustrated in Figure 2. There being three of the cams or lugs 67, and since the secondary shutter rotates twenty-four times for each single rotation of the spring drum 54, the opening thus formed by the primary shutter wings 17 will cooperate with or coincide with passage of the secondary shutter opening 33 for exposure purposes once during each eight revolutions of the secondary shutter 20 or in other words once during each one-third revolution of the spring drum 54.

In the drawings, I have disclosed means for providing one or more successive film exposures up to a maximum of twelve. In other words, the mechanism may be set for automatically effecting a single exposure or any number of exposures from one to twelve, always coming to rest following a predetermined number of exposures.

For this purpose, I provide the drum 54 with three equidistantly spaced stop lugs 76 engageable by a stop finger 77 for the purpose of stopping movement of the drum and holding it stationary against the urge of its spring. The finger is manually movable to and from operative position and for this purpose is provided with a knob equipped lever 78, the knob of which projects through a slot 79 in a wall of the housing so as to be engageable by an operator. The slot preferably has seats or notches 80 which may be utilized to secure the finger in its respective positions. See Figures 2 and 6. The lever 78 is equipped with a shoe or lug 81 the purpose of which will become apparent as the description progresses.

The drum gear 59 may be provided with three equidistantly spaced pins 82 which are engageable with the teeth of a rotatably mounted star wheel 83. As each of the pins 82 engages a star wheel tooth it will move the star wheel one step and thus the star wheel is moved a step for each one-third revolution of the spring drum 54. The star wheel is equipped with a single pin 84 which is engageable with the shoe or lug 81 for the purpose of automatically returning the stop finger 77 from the inoperative position shown in Figure 2 of the drawings to an operative position in the path of travel of one of the stop lugs 76, thus serving to discontinue operation of all parts upon completion of the desired number of exposures.

The shaft on which the star wheel is mounted is projected beyond a housing wall and equipped with a pointer 85 which may be manually operated to set the position of the exposure controlling pin 84. It should be understood that the pin 84 is positioned as many steps in advance of the position at which it engages and trips the lever shoe 81 as its desired exposures should be made. If a single exposure is to be made the pin is positioned to engage the shoe upon the first movement of the star wheel or in other words after one exposure has been completed. By setting the pin back the number of steps desired, lever contact may be withheld until the desired number of exposures have been completed after which the finger 77 will be moved into the path of the lug 76 which happens to be advancing and all moving parts will be stopped.

Sudden stopping of the rapidly rotating secondary shutter 20 is objectionable. Because of its rapid rotation, this shutter has considerable flywheel effect and without my improved overload clutch equipment breakage might often occur, particularly shearing of the securing pin 44. By reason of the provision of my improved overload clutch device, upon sudden stopping of the driving connections including the gears 61 and 46, the shutter 20 will be permitted to overrun slightly, the roller 40 leaving its seat 51 and riding up the clutch surface leading to the high point 49. Obviously, after the effort of the overrunning disc has been spent the shape of the complementary clutch faces will cause the parts to return to their normal driving relation illustrated in Figures 3 and 4 of the drawings and thus restoration of the synchronized relation of the shutters and the film feeding devices is assured and all danger of shearing of the pin 44 and other breakage avoided.

I claim:—

1. A camera shutter comprising; a rotating disc member having an aperture therein; a second device in line with the said member and adapted to open and close to periodically form an exposure opening, and means for mechanically actuating the said device in timed relation to said disc member to open once for every several revolutions of said disc member, at which time the opening and said aperture coincide.

2. A camera shutter comprising; a high speed rotating disc having an aperture therein; a butterfly device alined with said disc, and means for mechanically actuating said device in timed relation to said disc member to cause it to open once for a plurality of revolutions of said disc to provide an exposure opening, whereby the aperture in said disc becomes effective for making an exposure.

3. A moving picture camera, in which there is; a disc shutter; and means automatically operable in timed relation to said disc shutter for periodically interrupting the exposure function of the shutter and for periodically rendering effective the exposure function of said shutter, during continued rotation of the shutter.

4. A moving picture camera comprising; a step-by-step film feeding mechanism; a disc shutter arranged to complete a plurality of revolutions intermediate successive rest intervals of the film; an auxiliary shutter device; and means for mechanically actuating the shutter device in timed relation to said disc shutter to cause it to shield the film against exposure except at periodic intervals of rotation of the disc shutter and during rest intervals of said film.

5. In a camera, a primary shutter, a rotary secondary shutter, negative film feeding means, means to operate the shutters and the film feeding means in synchronism including devices to automatically stop movement of these parts upon completion of a predetermined exposure of the film, and means permitting overrunning of the rotary secondary shutter relative to said operating means upon stoppage of said operating means to avoid breakage due to flywheel effect of said rotary secondary shutter and serving automatically to restore the synchronized relation of the shutters, the film feeding devices and their operating means upon completion of said rotary secondary shutter overrun.

6. In a camera, a rotary shutter including a mounting sleeve, a driver shaft upon which said mounting sleeve is secured, a driver sleeve mounted on and slidable along the shaft, said sleeves having complementary overload clutch faces including diametrically oppositely disposed high and low points, means to yieldably hold the clutch faces in driving engagement and the shutter in a given relation to the driver sleeve, and driving connections for imparting rotation to the driving sleeve and including means to discontinue operation of said driving connections upon completion of a predetermined exposure whereby said shutter will be permitted to overrun upon stoppage of said driving relation and will be caused to resume its given relation to the driver sleeve upon completion of said overrun.

7. In a camera, a shutter and driving means therefor rapidly rotatable during the making of exposures and subject to being suddenly stopped upon completion of a given exposure, said shutter driving means including longitudinally separable sleeve members having complementary overload clutch faces yieldably held in driving relation and having a single mating relation from which they yield to permit overrunning of the shutter upon stoppage of said driving means and to which they return upon completion of said overrun to restore the normal relation of the shutter and its driving means.

8. In a camera, a shutter and driving means therefor rapidly rotatable during the making of exposures and subject to being suddenly stopped upon completion of a given exposure, said shutter driving means including longitudinally separable sleeve members having complementary overload clutch faces yieldably held in driving relation and capable of separating to permit overrunning of the shutter upon stoppage of said driving means and of returning to their normal driving relation upon completion of said overrun, one said clutch face having a position determining recess and the other of said clutch faces having a roller to enter said recess to assure restoration of the normal relation between shutter and driving means.

9. In a camera, a shutter and driving means therefor rapidly rotatable during the making of exposures and subject to being suddenly stopped upon completion of a given exposure, said shutter driving means including longitudinally separable sleeve members having complementary overload clutch faces yieldably held in driving relation and capable of separating to permit overrunning of the shutter upon stoppage of said driving means and of returning to their normal driving relation upon completion of said overrun, each said clutch face comprising diametrically oppositely disposed high and low points joined by gradually curved face portions, and one of said clutch faces having at its low point a position determining recess and the other of said clutch faces having at its high point a roller to enter said recess to assure restoration of the normal relation between shutter and driving means.

10. In a camera wherein is provided a shutter, means to rapidly rotate the shutter, and means to suddenly stop operation of the shutter rotating means upon completion of a predetermined exposure; said shutter including a rotary disc, a mounting sleeve secured to the disc, an overload clutch sleeve secured in the mounting sleeve and terminating at one end in an overload clutch face; said shutter rotating means including a rotary shaft, a pinion sleeve slidably mounted on the shaft and terminating at one end in an overload clutch face, and means to impart rotation to said pinion sleeve; said clutch faces having a single mating and driving relation, and means for yieldably holding the clutch faces in their mating and driving relation and serving to permit the clutch faces to separate upon overload due to sudden stoppage of the shutter rotating means to allow the shutter to overrun and then cause them to return to their mating and driving relation.

11. In a camera wherein is provided a shutter, means to rapidly rotate the shutter, and means to suddenly stop operation of the shutter rotating means upon completion of a predetermined exposure; said shutter including a rotary disc, a mounting sleeve secured to the disc, an overload clutch sleeve secured in the mounting sleeve and terminating at one end in an overload clutch face; said shutter rotating means including a rotary shaft, a pinion sleeve slidably mounted on the shaft and terminating at one end in an overload clutch face, and means to impart rotation to said pinion sleeve; said clutch faces having a single mating and driving relation and each comprising a high point and a low point diametrically oppositely disposed and joined by gradually curved surfaces, and means for yieldably holding the clutch faces in their mating and driving relation and serving to permit the clutch faces to separate upon overload due to sudden stoppage of the shutter rotating means to allow the shutter to overrun and then cause them to return to their mating and driving relation.

12. In a camera wherein is provided a shutter, means to rapidly rotate the shutter, and means to suddenly stop operation of the shutter rotating means upon completion of a predetermined exposure; said shutter including a rotary disc, a mounting sleeve secured to the disc, an overload clutch sleeve secured in the mounting sleeve and terminating at one end in an overload clutch face; said shutter rotating means including a rotary shaft, a pinion sleeve slidably mounted on the shaft and terminating at one end in an overload clutch face, and means to impart rotation to said pinion sleeve; said clutch faces having a single mating and driving relation and each comprising a high point and a low point diametrically oppositely disposed and joined by gradually curved surfaces, and one said clutch surface being provided at its low point with a seating recess and the other said clutch surface being equipped at its high point with a roller for normally seating in the recess and for at other times rolling over the clutch face which it opposes, and means for yieldably holding the clutch faces in their mating and driving relation and serving to permit the clutch faces to separate upon overload due to sudden stoppage of the shutter rotating means to allow the shutter to overrun and then cause them to return to their mating and driving relation.

13. In a camera wherein is provided a shutter, means to rapidly rotate the shutter, and means to suddenly stop operation of the shutter rotating means upon completion of a predetermined exposure; said shutter including a rotary disc, a mounting sleeve secured to the disc and including an enlarged cylindrical portion, said disc having an exposure opening therein, and a second disc rotatably mounted on the cylindrical portion and having an opening for cooperating with the first mentioned disc opening to provide an adjustable exposure opening, an overload clutch sleeve secured in the mounting sleeve and terminating at one end in an overload clutch face; said shutter rotating means including a rotary shaft, a pinion sleeve slidably mounted on the shaft and terminating at one end in an overload clutch face, and means to impart rotation to said pinion sleeve; said clutch faces having a single mating and driving relation, and means for yieldably holding the clutch faces in their mating and driving relation and serving to permit the clutch faces to separate upon overload due to sudden stoppage of the shutter rotating means to allow the shutter to overrun and then cause them to return to their mating and driving relation.

14. In a camera wherein is provided a shutter, means to rapidly rotate the shutter, and means to suddenly stop operation of the shutter rotating means upon completion of a predetermined exposure; said shutter including a rotary disc, a mounting sleeve secured to the disc, an overload clutch sleeve secured in the mounting sleeve and terminating at one end in an overload clutch face; said shutter rotating means including a rotary shaft, a pinion sleeve slidably mounted on the shaft and terminating at one end in an overload clutch face, and means to impart rotation to said pinion sleeve; said clutch faces having a single mating and driving relation, an abutment collar carried by the shaft, and an expansion spring coiled about the shaft and engaging the collar and the sleeve pinion for yieldably holding the clutch faces in their mating and driving relation and serving to permit the clutch faces to separate upon overload due to sudden stoppage of the shutter rotating means to allow the shutter to overrun and then cause them to return to their mating and driving relation.

ALVIN L. MAYER.